April 7, 1942.   D. A. KALOSHIN   2,278,700
AIR BRAKE
Filed Sept. 27, 1940   5 Sheets-Sheet 1

INVENTOR.
DMITRI ANDREIEVICH KALOSHIN
BY Alexander Rich
ATTORNEY.

April 7, 1942.  D. A. KALOSHIN  2,278,700
AIR BRAKE
Filed Sept. 27, 1940   5 Sheets-Sheet 4

INVENTOR.
DMITRI ANDREIEVICH KALOSHIN
BY Alexander Rishoff
ATTORNEY.

Patented Apr. 7, 1942

2,278,700

UNITED STATES PATENT OFFICE 2,278,700

AIR BRAKE

Dmitri Andreievich Kaloshin, San Francisco, Calif., assignor of one-half to Paul Pimenoff and Pelagea Lubushkin, both of San Francisco, Calif.

Application September 27, 1940, Serial No. 358,625

11 Claims. (Cl. 303—35)

This invention relates to air brakes.

Air brakes presently in general use on railroad cars and engines, buses and other vehicles are operated by compressed air at certain standard pressure, and each vehicle is equipped with a supply tank in which the compressed air is stored for the purpose of operation of the brakes. The air at said standard pressure is supplied to the supply tank by the main line to which all the supply tanks are connected. The present brakes are so designed that the compressed air may be supplied to the supply tanks only when the brakes are not in operation, and therefore if the brakes are applied for a comparatively long period of time, the supply tank may become exhausted, and thereupon the brakes shall become inoperative.

The air brakes are actuated by brake actuating mechanisms, which are also connected to the main line, when the air pressure in the main line drops from the standard pressure to a certain operating pressure. It takes an appreciable period of time to reduce the air pressure in said main line to the operating pressure if the line is of considerable length. To release the brakes, the air pressure in the main line is increased to the standard pressure, whereupon the actuating mechanism releases the brakes.

In the present air brakes the release of the brakes is not sufficiently elastic and the brakes cannot be released to a desired degree and held in such position for a desired length of time. Furthermore, braking power is equally applied on all cars in a train, whereas it is desirable to vary the application of braking power depending upon the character of a car and speed of a train.

It is the object of this invention to provide an air brake which is adapted to supply the compressed air to supply tanks from the main line when the brakes are applied, if so desired.

Another object of this invention is to accelerate the application of the brakes and make the same practically simultaneous for all the cars in a train.

Another object of this invention is to provide a means for gradual intermittent release of the brakes to any desired degree, said means being adapted to hold said brakes in any desired position for any length of time.

Another object of this invention is to provide means for individual adjustment of application of brakes on the cars, so as to suit various load and speed conditions.

Other objects and advantages will appear as the specification proceeds and the particular features of the device will be specifically pointed out in the appended claims.

In this specification and the annexed drawings, the invention is illustrated in the form considered to be the best, but it is to be understood, that the invention is not limited to such form; and it is also to be understood that in and by the claims following the description, it is desired to cover the invention in whatsoever form it may be embodied.

My air brake consists of an actuating mechanism 1 attached to a vehicle by a bracket 1' and connected with a main line 2 by a conduit 3, and a supply tank 4, and a brake mechanism 6 communicating with said mechanism by the pipes 5 and 7 respectively.

Figure 1:
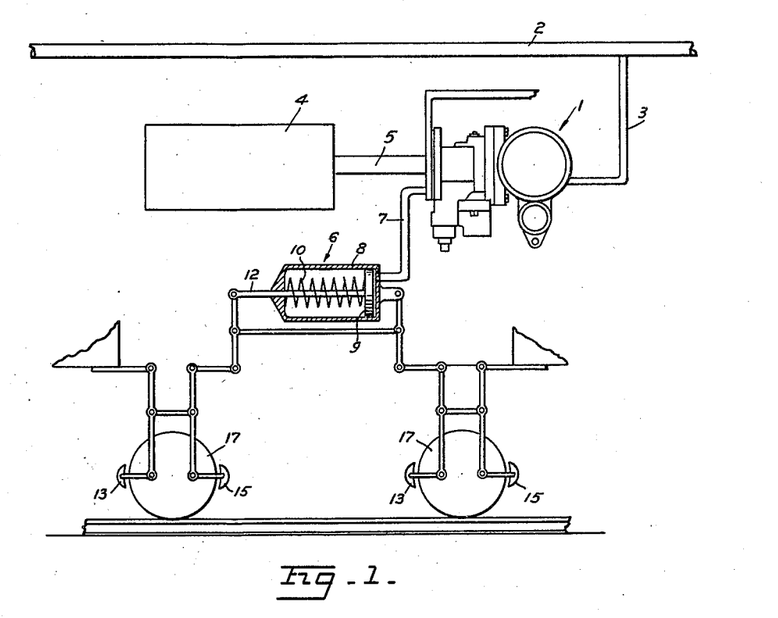
Fig. 1 is a diagrammatic view showing the relation of various parts and mechanisms in the air brake which constitutes the subject-matter of this invention.

The brake mechanism 6 consists of a cylinder 8, a piston 9 slidably confined therein, a spring 10 which yieldably forces said piston 9 into its normal inoperative position, shown in Fig. 1, and a shaft 12 connected to the piston. The shaft 12 by means of links and levers, well known in the art and therefore shown diagrammatically in the drawings, operates the brake shoes 13 and 15, so as to bring the same into frictional engagement with the wheels 17, whenever the piston 9 is moved to the left looking at said figure. The piston 9 is actuated by compressed air entering the cylinder 8 through the pipe 7 and the actuating mechanism 1 from the supply tank as hereinafter shall be stated in detail.

Figures 5, 12, 13, 14:
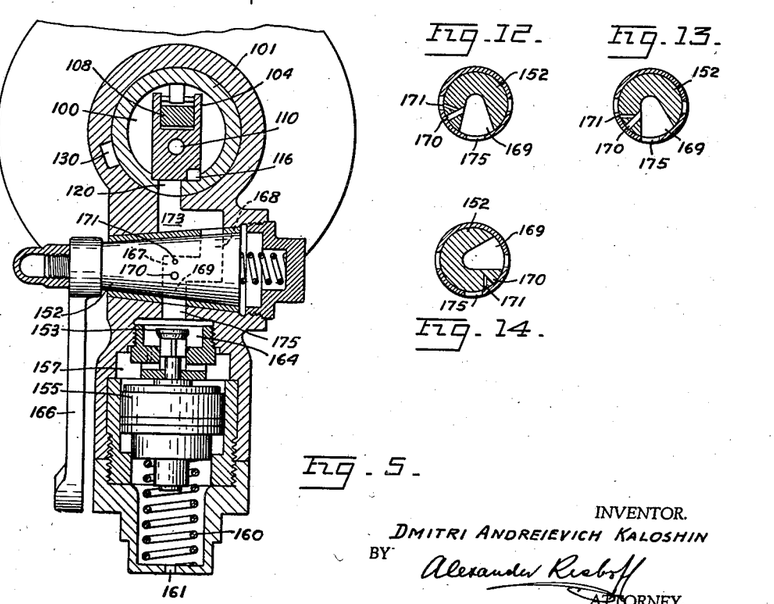
Fig. 5 is a sectional view, partly in elevation, taken along the line 5—5 of the Fig. 3.
Figs. 12, 13 and 14 are central cross-sections through a stop-cock and a bushing, showing various positions of the stop-cock.
Figures 6, 7, 8:
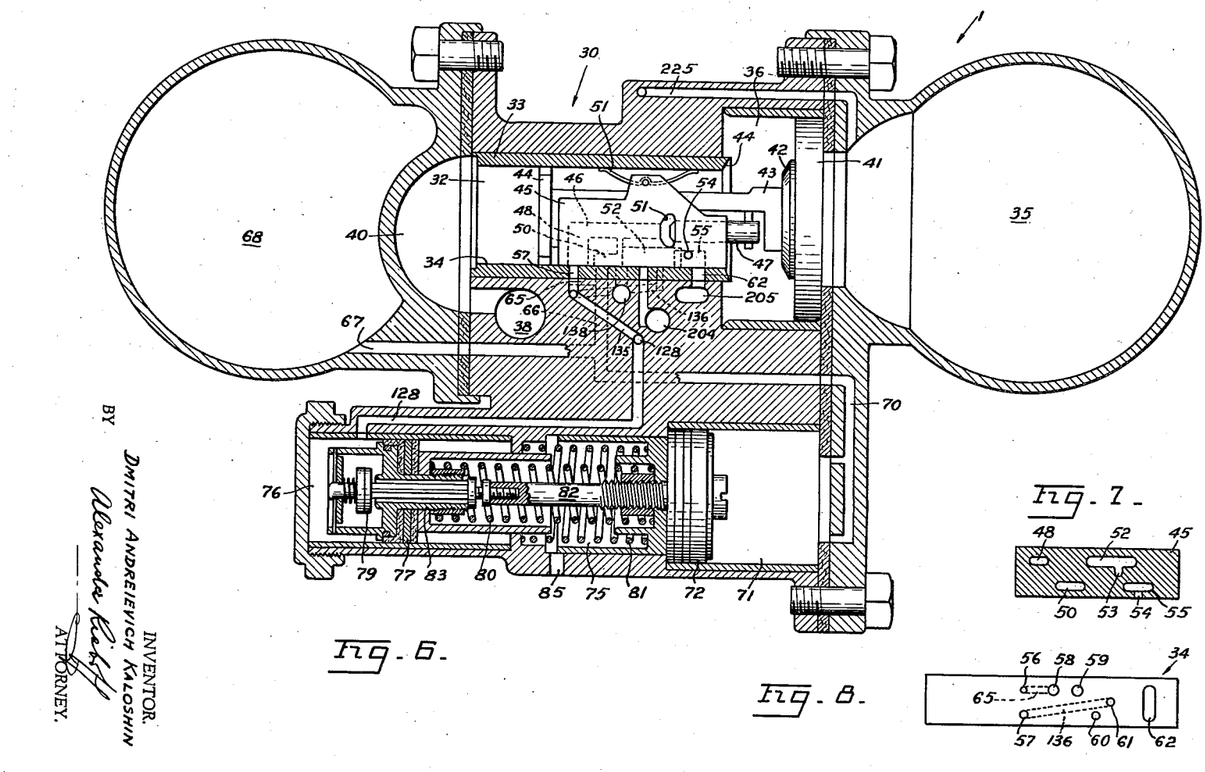
Fig. 6 is a sectional view, partly in elevation, taken along the line 6—6 of the Fig. 3.
Fig. 7 is a section through a sliding valve taken near the sliding surface thereof.
Fig. 8 is a plan view of the level portion of a bushing upon which portion the above mentioned valve is adapted to slide.
Figures 9, 10, 11:
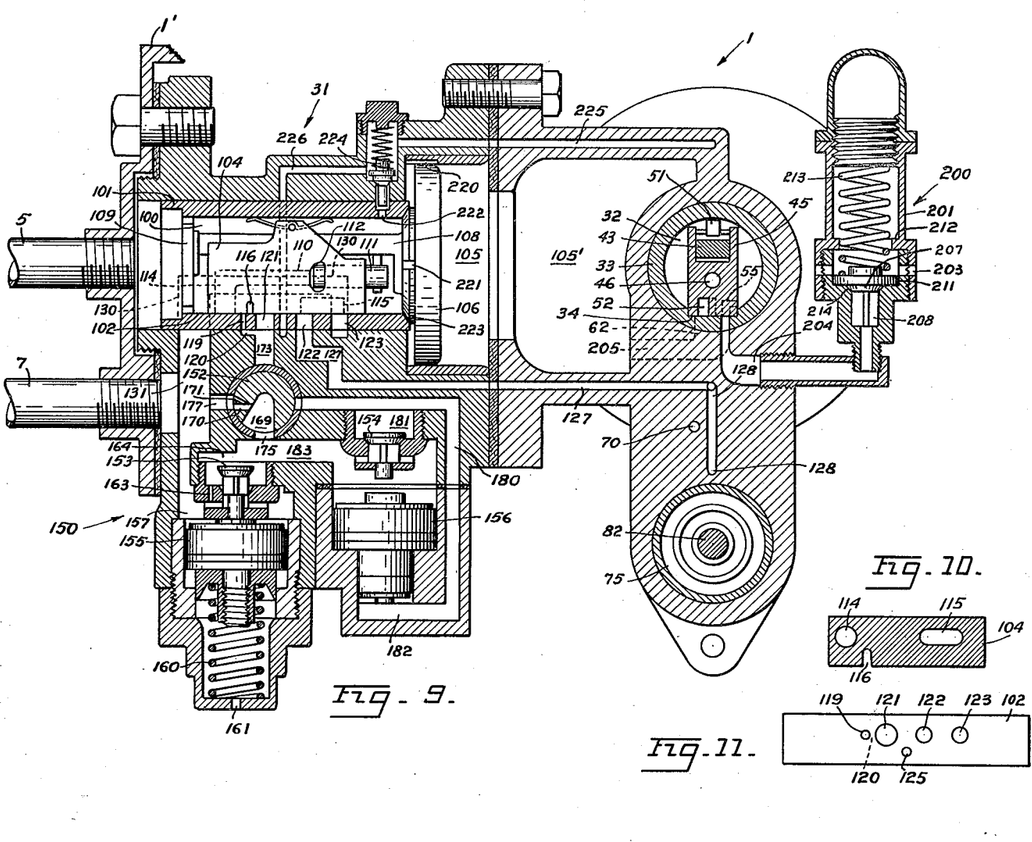
Fig. 9 is a sectional view, partly in elevation, taken along the line 9—9 of the Fig. 3.
Fig. 10 is a section through a second sliding valve taken near the sliding surface thereof.
Fig. 11 is a plan view of the level portion of a second bushing upon which portion the above mentioned second sliding valve is adapted to slide.

The actuating mechanism 1 consists of a first actuator 30, shown in detail in Fig. 6, and a second actuator 31 shown in detail in Figures 9 and 5. The actuators are designed to maintain the supply tank 4 fully supplied with the compressed air, to introduce air at the desired pressure from the supply tank 4 into the cylinder 8, to maintain desired pressure in the cylinder 8, and to release air from said cylinder into the atmosphere.

The actuators 30 and 31 are operated by the variations of the air pressure in the main line 2.

The first actuator 30 consists of a sliding valve chamber 32 formed in a bushing 33 having a level portion 34. The chamber 32 communicates with a piston chamber 36 which in turn communicates with a tank 35. Compressed air is introduced from the main line 2 into said chamber 32 by means of a conduit 3, through a passage 38 in the body of said actuator 30, a hollow semisphere 40 formed at the left end of the chamber 32, looking at Fig. 6.

A piston 41 is slidably confined in the piston chamber 36 and has a valve portion 42 formed integral with said piston on the side thereof facing the bushing 33. The valve portion 42 is adapted to close the bevelled end 44 of said bushing when the piston 41 moves into the extreme left position.

A piston rod 43 is affixed to said piston and terminates with a star-shaped washer 44 adapted to slide in the chamber 32 and keep said piston rod level.

A sliding valve 45 is set, and adapted to slide, upon the level portion 34 of the bushing 33. The valve 45 has a longitudinal bore 46, one end of which is closed by a plunger 47 affixed to the piston rod 43, and the other end terminates with a downwardly extending passage 48. Another air passage 50, communicating with the bore 46, is formed in said valve 45 in close proximity and in front of the passage 48. An opening 51 is cut through the sides of the valve 45 near the end of the plunger 47 leading thereto, so that whenever said plunger is withdrawn, even slightly, from its innermost position, the compressed air enters from said chamber 32 into said bore 46 and passages 48 and 50.

The valve 45 is held in the sliding contact with the level portion 34 of the bushing 33 by a spring 51 and whenever the piston 41 moves to the right, looking at Fig. 6, the plunger 47 is withdrawn from the bore 46, thus permitting the air to enter the same, and the valve 45 is pushed by the rear portion 48 of the piston rod 43 in the same direction. Whenever the piston 41 moves to the left, the plunger 47 closes the bore 46 and pushes said valve to the left also.

There are, in addition to the passage 48 and 50, two other passages in the valve 45: a passage 52 having a side cavity 53 and a passage 55 for the purpose to be hereinafter stated. The latter passage communicates with the chamber 32 by means of a side opening 54.

All the passages are off-set from the center line so as to properly communicate with the apertures 56, 57, 58, 59, 60, 61, and 62 in the level portion 34 of the bushing 33. Compressed air, being introduced at a standard pressure, preferably 75 pounds, from the main line 2 through the conduit 3 into the chamber 32, forces the piston 41 to move in the extreme right position whereby the plunger 47 opens the bore 46 and the compressed air passes through the same into passage 48, through the aperture 56 in the bushing 33, small passage 65 under said bushing, passage 66, passage 67 into an auxiliary tank 68 and also from the passage 66 through the passage 70 into a piston chamber 71 in which a piston 72 is slidably arranged. The auxiliary tank 68 being connected through the passages 67 and 70 with the chamber 71 increases the capacity of the latter.

A chamber 75 is formed as a continuation of the chamber 71, and a third chamber 76 constitutes the continuation of the chamber 75. A second piston 77 is slidably confined in the chamber 76 and has a spring pressed valve 79 arranged on the left side, looking on Fig. 6, and in the center thereof, which valve, when opened, as shown in said figure, permits the air to escape from the chamber 76 into the chamber 75. A spring 80 is yieldably forcing the pistons 72 and 77 apart, and an additional spring 81 forces the piston 72 to the right looking at Fig. 6.

Compressed air acts upon the piston 72 and forces the same to the extreme left position, as shown on said Fig. 6. The rod 82 of the piston 72 presses against the stem of the valve 79 and the hollow rod 83 of the piston 77 and thereby opens said valve. It also pushes the piston 77 to the extreme left position, thus opening a passage for the air from the chamber 76 into the chamber 75 and therefrom through the opening 85 in the wall of the latter chamber into the atmosphere, the purpose of which arrangement shall be hereinafter stated in detail.

The second actuator 31 is located in near proximity and at the right angle to the first actuator 30 and is connected with the latter by various passages. The construction of the second actuator is substantially the same as that of the first actuator, and, as shown in Fig. 9, it consists of a sliding valve chamber 100 formed by a bushing 101, having a level portion 102 provided therein upon which a sliding valve 104 is adapted to slide. The chamber 100 communicates with an auxiliary chamber 105' common with a piston chamber 105 within which a piston 106 is slidably confined. The latter carries a rod 108 terminating with a star-shaped washer 109, slidable in the chamber 100, for the purpose of keeping said rod level.

The construction of the sliding valve 104 is substantially identical with that of the valve 45 of the first actuator 30 and has a central longitudinal bore 110, a plunger 111 adapted to permit or restrict the access of compressed air from the chamber 105, through the cut 112 in the side of said valve, to the bore 110. The latter terminates with a transverse passage 114. The valve 104 also has an inner passage 115 and a side outlet passage 116.

The level portion 102 of the bushing 101 is formed with a small aperture 119 connected by a passage 120 with an aperture 121, apertures 122, and 123, and an off-set small aperture 125, designed to register with passage 116.

The aperture 122 communicates with the passage 127 which is in communication with the passage 128 (see Fig. 6) which latter passage is connected with the chamber 76. The aperture 123 is provided with a passage 130 extending on the side of the bushing 101 and connected with the hollow space 131 which in turn is connected by means of the pipe 7 with the brake mechanism 6. Therefore the compressed air will flow from the mechanism 6 through the pipe 7, space 131, passage 130, aperture 123, passage 115, aperture 122, passage 127, passage 128, chamber 76, valve 79, chamber 75 and opening 85 to the atmosphere. This is the first path connecting the mechanism 6 with the atmosphere.

At the same time the compressed air from the brake mechanism 6 passes from the passage 128 (Fig. 6) into an inclined passage 135, and therefrom into another inclined passage 136, through the aperture 61, side cavity 53, passage 52, aperture 59, and passage 138 leading to the atmosphere. This is the second path connecting the mechanism 6 with the atmosphere.

The hollow space 131 communicates with a mechanism 150 for individual adjustment of the brake operating mechanism 6. The mechanism 150 consists of a stop-cock 152, and two valves 153 and 154 operable by the pistons 155 and 156 respectively in the following manner. The space 131 communicates with a chamber 157 in which a piston 155 is adapted to move. A spring 160 holds the piston 155 in upward position, as shown in Fig. 9, as long as no compressed air is introduced into the space 131 and the chamber 157. In the latter case the piston 155 is forced down, and the air confined in the lower portion of said chamber 157 is exhausted therefrom into the atmosphere through the perforation 161. Above the piston 155 is located said valve 153 which is shown in raised position in Fig. 9. A small bore 163 is provided between the chambers 164 and 157, so that the air may pass from the first into the second chamber. When the pressure of air in the chamber 157 reaches a certain level the piston 155 is forced down, thereby closing the valve 153 whereupon the air passes through the bore 163. By this arrangement the compressed air is admitted in large quantities at the beginning of the braking operation, thus assuring the quick action of the brakes. But when the brake mechanism has acted, further supply of air to compensate possible leakage is delivered through the bore 163.

The stop-cock 152 is arranged above the chamber 164. It is operated by a handle 166 attached thereto for the purpose of rotating the same and bringing thereby into various positions. The stop-cock has a central bore 167 and apertures 168, 169, 170 and 171 leading from said bore to the surface of the stop-cock. The aperture 168, as shown in Figs. 5 and 9 is connected by a passage 173 with the apertures 119 and 121 in the portion 102 of the bushing 101, and the aperture 169 is connected by a short passage 175 with the valve chamber 164.

The compressed air from the chamber 100 may pass through the central bore 110, passage 114, apertures 119 and 121, passage 173, aperture 168 in the stop-cock 152, bore 167, aperture 169, into the valve chamber 164, from which the air will pass through the small bore 163 and through the valve 153, if the same is opened. As shown in Fig. 9, the apertures 170 and 171 of which the first one is larger than the second one, communicate with a passage 177 leading into the space 131, permitting the compressed air to pass through said apertures into said space.

It is obvious that by rotating the stop-cock 152 in counter clock-wise direction, various combinations of passages and apertures may be obtained, as shown in Figures 12, 13 and 14.

When the stop-cock 152 is in the position shown in Fig. 9, the discharge of the compressed air into the space 131 and therefrom into the brake mechanism 6 is the largest, as the air is passing through the apertures 170, 171 into the space 131 directly and through the aperture 169, through the valve 153 and the bore 163, which discharge results in quick action of the brake mechanism. This position of the stop-cock 152 is used on the brakes of the passenger cars of the fast trains.

The position of the stop-cock shown in Fig. 12 permits slower discharge of the compressed air therethrough than that previously described, as the aperture 170 is closed, and therefore the action of the brakes is somewhat slower. The stop-cock is preferably brought into this position on all passenger cars of an ordinary train.

The position of the stop-cock shown in Fig. 13 permits still less compressed air to pass therethrough as both apertures 170 and 171 are cut off, and therefore the action of the brakes will be still slower. This position is used in connection with loaded cars of a freight train.

It shall be noted that independent of the position of said stop-cock 152 heretofore discussed, the air brake mechanism shall operate under the same air pressure, and the said various positions of the stop-cock are used only for the purpose of changing the speed of application of the brakes.

The last position of said stop-cock 152 is shown in Fig. 14 in which all the compressed air is directed through the aperture 169 into a passage 180 communicating with a chamber 181 of the valve 154 and the bottom portion of the piston chamber 182 of the piston 156. In this case the compressed air will force the piston 156 to raise and open the valve 154 through which the air will fill the upper portion of the piston chamber 182 and through the passage 183 will pass into the chamber 164, and therefrom through the bore 163 and through the valve 153 which is open at that time, into the piston chamber 157.

It will be noted that the bottom portion of the piston 156 has only one half of the area of the top portion, and, therefore, if the pressure of the air in the chamber 182 exceeds one-half of the pressure of air in the passage 180, the piston 156 goes down, the valve 154 closes and remains closed until the pressure of the air in the passage 183 is lowered to less than one half of the pressure in said passage 180. By this arrangement the brake mechanism is steadily actuated only at one half of the pressure in the main line 2 whenever the brakes are applied. This position of the stop-cock 165 is used in connection with empty cars when the same are mixed in the same train with loaded cars.

Therefore, by means of the mechanism 150, the speed of application of the brakes may be adjusted to suit the particular conditions, and the air pressure applied on the brake operating mechanism may be cut to one half of the pressure in the main line.

As it has been heretofore explained, the air brake is actuated by the decrease of the air pressure in the main line 2 of a train. But if a train is sufficiently long, it will take considerable time until the air pressure in the main line drops down to a desired operative level throughout the length of the train. Furthermore, the decrease of the air pressure in the main line will be gradual and will affect cars gradually, beginning with the cars closest to the engine.

In order to facilitate the operation of the air brakes, and force the brakes to act simultaneously, I provide a valve mechanism 200 for additional discharge of the pressure in the main line 2, whenever said pressure falls down to a predetermined pressure. The valve mechanism 200 consists of a housing 201 which has a plurality of discharge openings 203. The housing 201 is in communication with the passage 204 terminating with the aperture 60 in the bushing 33. When the main piston 41 moves to the left looking at Fig. 6 due to the change in air pressure in the tank 35, the aperture 60 registers with the aperture 55 in the sliding valve 45 thus permitting the compressed air to pass from the valve chamber 32 to the valve mechanism 200.

The latter includes a valve 207 having a star-shaped stem 208 and a broad shoulder 211 on the valve proper. A spring 213 yieldably holds said valve against the seat 214. When the compressed air passes to the valve 207 under pressure sufficient to raise the valve slightly, the air immediately passes to the shoulder 211 and, acting on a greater area, quickly moves said valve against the stop 212 and beyond the discharge openings 203, through which the air is discharged into the atmosphere. The spring 213 is of such force as to be initially compressed by the pressure somewhat less than the standard pressure and higher than the operating pressure and to close the valve when the air pressure drops to the operating pressure. By additional discharge of air from all the brake actuating mechanisms 1 and from the main line 2 of a train, the former will be forced to actuate and the brakes will be immediately applied.

The operation of the device may be divided into the following steps: charging of the device with compressed air, application of the brakes, supplying the brake mechanism and the supply tank with compressed air when brakes are applied, and the release of the brakes.

The standard pressure which is maintained in the main line is preferably equal to 75 pounds. When the compressed air is introduced into the main line 2 and therefrom into the chamber 32, it forces the piston 41 to the extreme right, as shown in Fig. 6, and, as it has been previously explained, enters the auxiliary tank 68 and the chamber 71 and forces the pistons 72 and 77 and the valve 79 to the extreme left, thus opening a passage for the air from the brake cylinder 8 into the atmosphere.

At the same time the compressed air flows from the chamber 32 through the passage 55 in the sliding valve 45, the aperture 62 in the bushing 33, the passage 205, into the piston chamber 105 of the second actuator 31 and forces the piston 106 into the position shown in Fig. 9. There is a groove 220 provided on the inner wall of said chamber 105, extending less than a half of the length of said chamber, through which groove the air passes from the chamber 105 around and on the other side of the piston 106. Another groove 221 is cut on a valve portion 223, formed on the side of the piston 106, facing the bushing 101, for the purpose of closing the same. The air passes through said groove 221 into the valve chamber 100 and therefrom into the supply tank 4.

An aperture 222 is provided in the bushing 101 which leads to a spring pressed valve 224. The compressed air lifts said valve 224 and passes to a passage 225 and through the same into the tank 35 of the first actuator 30. The compressed air from the valve 224 also passes into a passage 226 around the bushing 101 to the aperture 125, which is closed at that time. Therefore, equal air pressure is established on both sides of each of the pistons 41 and 106, the brake mechanism 6 communicates with the atmosphere in two ways, as has been heretofore described in detail, and the supply tank 4 is charged with compressed air.

Figure 15:
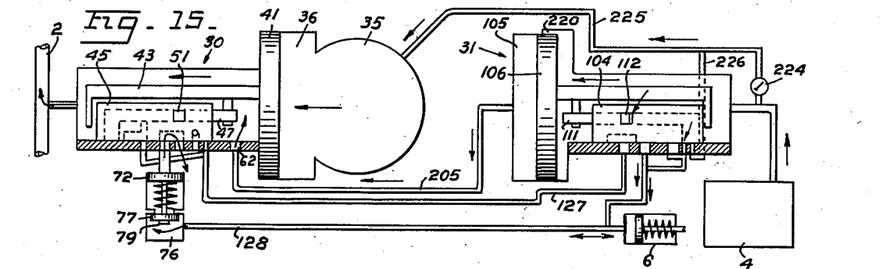
Figs. 15, 16, 17 and 18 are diagrammatic illustrations of the positions of various parts of the air brake during the partial and full application of the brakes, supply of air when the brakes are applied, and gradual intermittent release of the brakes, respectively.
Figure 16:
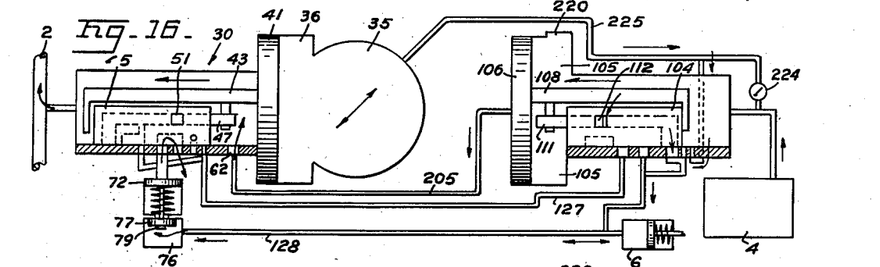

To actuate the brakes it is necessary to reduce the air pressure in the main line to an operating pressure which is preferably about 55 pounds when full application of air brakes is desired, and is higher than that if partial application of braking power is intended. Figures 15 and 16 diagrammatically illustrate the position of various parts of the actuating mechanism 1 when the brakes are partially and fully applied, respectively.

When the air pressure in the main line 2 is reduced, the piston 41, under the pressure of the compressed air in the tank 35, moves straight to the extreme left position, closing the bore 46 by the plunger 47 and pushing the sliding valve 45 into the extreme left position. The passage 55 registers with the aperture 60 and the air passes through the passage 204 to the valve mechanism 200 for additional discharge of air. As has been heretofore explained, the valve 207 opens and lets the air pass to the atmosphere, thus reducing the pressure in the chamber 32, and, consequently, in the main line 2.

The passage 52 in the sliding valve 45 registers with the apertures 58 and 59 and the air from the auxiliary tank 68 and piston chamber 71, passes into the atmosphere through the passage 138. Thereupon the piston 72 moves to the extreme right position, looking on the Fig. 6, the valve 79 closes, and the air passage from the brake mechanism 6 to the atmosphere is cut off.

The air pressure in the auxiliary piston chamber 105′ also decreases, as the latter is connected with the chamber 32 by means of the passage 205 and the aperture 62 which is now open. The compressed air in the supply tank 4 and in the chamber 100 pushes the piston 106 away from the bushing 101, thus cutting the groove 220 off the chamber 105, and the passage of the compressed air from the main line 2 into the supply tank 4 ceases.

The piston 106 is pushed by the compressed air in the supply tank 4 certain distance away from the bushing 101 depending upon the air pressure in the main line 2. It is shown in Fig. 15 in the middle of the piston chamber 105, in which case the brakes are only partially applied, and in the extreme left position in Fig. 16, when the brakes are fully applied. The plunger 111 opens the entrance into the bore 110, the opening 114 registers with the aperture 119 and 120, and the compressed air passes from the supply tank 4 into the passage 173, through the stop-cock 152, into the space 131, and to the brake mechanism 6 and actuates the latter. If the air pressure in the tank 4 falls slightly below the pressure in the main line 2, the piston 106 moves slightly to the left, thereby closing the bore 110 by the plunger 111, and the flow of air from the tank 4 to the brake mechanism 6 is cut off. At this time the mechanism 6 is also cut off from the atmosphere.

During the application of the brakes, the compressed air from the tank 35 is gradually discharged through the passage 225, above the valve 224, through the passage 226, aperture 125, passage 116, into the chamber 100 which communicates directly with the tank 4.

Therefore, the air pressure on the left side of the piston 41, looking on the Fig. 6, is equal to the pressure in the main line 2, and on the right side of said piston to the pressure in the supply tank 4; and the air pressure on the left side of the piston 106, looking on the Fig. 9 is equal to the pressure in said supply tank, and on the right side, to the pressure of the main line 2. Whenever the relative pressures in the main line 2 and the supply tank 4 change, the pistons 41 and 106 change their positions accordingly.

If it is desirable to apply the brakes for a considerable period of time with substantially the same force, it is necessary to supply the brake mechanism 6 with compressed air, otherwise the supply tank 4 may become exhausted through leakage in said brake mechanism and the brakes thus rendered inoperative.

Figure 17:
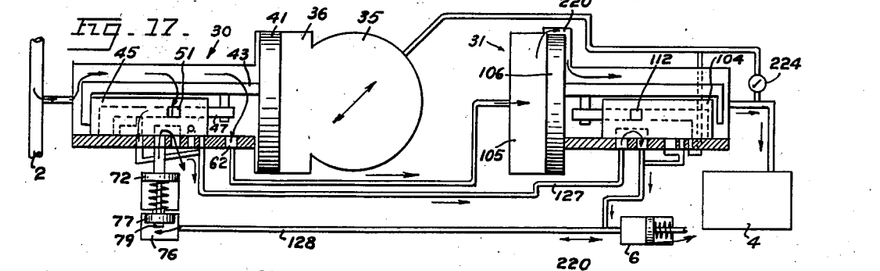

Fig. 17 diagrammatically shows the position of various parts of the actuating mechanism when the compressed air is supplied to the supply tank 4 during the braking operation. It is necessary to reduce the pressure in the main line 2 to the operating pressure, preferably 55 pounds, and maintain the same for the period of the braking operation.

Figure 2:
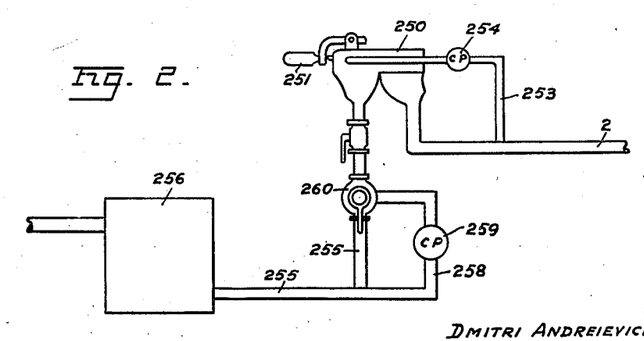
Fig. 2 is a diagrammatic view showing the operating valves used in connection with said air brake.
Figure 3:
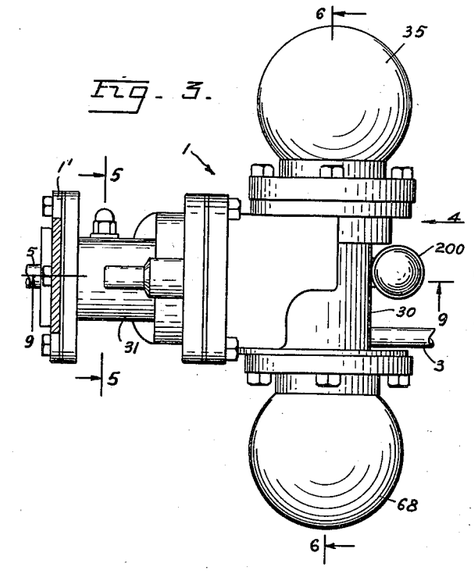
Fig. 3 is a plan view of a brake actuating mechanism.
Figure 4:
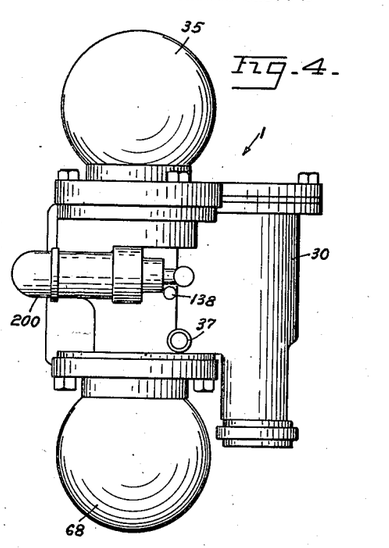
Fig. 4 is a side view of said mechanism looking in the direction of the arrow 4 on the Fig. 3.

As shown in Fig. 2, the main line 2 is connected to a standard operating valve 250, having a handle 251. By manipulating the handle 251 the air pressure in the line 2 may be decreased, or increased, to various pressures, or the compressed air may be by-passed through a pipe 253 and a constant pressure valve 254 which will maintain the standard pressure of preferably 75 pounds in said main line 2. The compressed air is delivered to the operating valve 250 by a pipe 255 from the main supply tank 256. A by-pass pipe 258, a constant pressure valve 259 and a three-way valve 260 are arranged in connection with the pipe 255, by means of which the air from the main supply tank 256 may be passed through said pipe 258, valve 259 and valve 260 into the main line 2, in which case a flow of compressed air at operating pressure of preferably 55 pounds will be maintained in said line 2. If the brakes have been applied for a considerable period of time and due to the leakage of air the pressure in the brake mechanism decreases, and becomes less than that in the main line 2, the piston 106 of the second actuator 31 moves to the bushing 101 and closes the same, and the piston 41 is slightly moved away from the bushing 33. Thereupon an air passage from the main line 2 to the brake mechanism 6 is established as follows: the main line 2, chamber 32, bore 46, passage 50, aperture 57, passage 128, passage 127, aperture 122, passage 115, aperture 123, passage 130, area 131, pipe 7, to the brake mechanism 6.

Compressed air from the chamber 32 also passes to the supply tank 4 through the aperture 62, passage 205, chamber 105, grooves 220 and 221, chamber 100, pipe 5, to the tank 4. Therefore, the brake mechanism 6 and the supply tank 4 are supplied with the compressed air from the main line 2 as long as the pressure in the main line is maintained at the constant operating pressure, and the brakes may be applied for any length of time without any danger of exhausting the supply tank, and rendering the brakes inoperative.

An operator may either release the brakes completely and immediately, or gradually, step by step. For the complete release of the brakes, the pressure in the main line 2 is raised to the standard pressure. In this case the piston 41 travels to the extreme right position, looking at Fig. 6, the pistons 72 and 77 are actuated, and the valve 79 opens, thus releasing the air from the brake mechanism 6. Communication between the supply tank 4 and the mechanism 6 is cut off.

Figure 18:
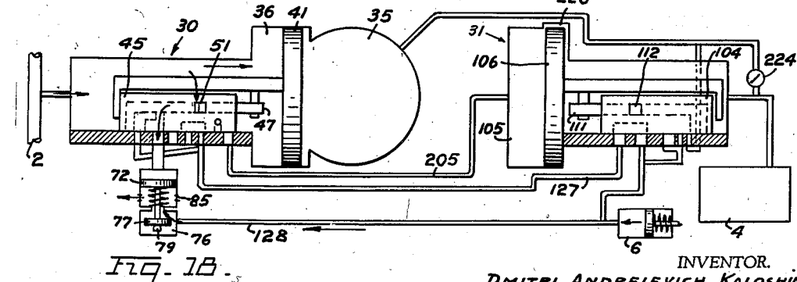

If it is desired to release the brakes to a certain degree only, the pressure in the main line is raised to a certain level above the operating and below the standard pressure. Then the piston 41 travels to the right, looking at Fig. 18, approximately a half of the length of the chamber 36. The plunger 47 opens the passage into the bore 46 and the compressed air passes from the chamber 32 into said bore 46, passage 48, aperture 58, passage 66, passage 70, chamber 71, and will force the pistons 72 and 77 to the left some distance and open the valve 79. The air from the brake mechanism 6 will pass to the atmosphere the following way: through the space 131, passage 130, aperture 123, passage 115, aperture 122, passages 127 and 128, chamber 76, valve 79, chamber 76, opening 85 to the atmosphere. When certain amount of air is released from the brake mechanism 6, the air pressure in the chamber 76 will be reduced and the spring 80 will move the piston 77 to the left looking on the Fig. 6, thereby closing the valve 79. If further release of the brakes is desirable, the pressure in the main line 2 is increased, and the pistons 72 and 77 will move again to the left and open the valve 79. More air will be released from the brake mechanism 6 until the piston 77 again moves to the left and closes the valve 79.

This process may be repeated over and over again until the piston 72 will reach its extreme left position. Therefore the release of the brakes may be regulated by the air pressure in the main line 2, and the brakes will be held in the desired position any length of time.

From the above description follows that my air brake will act quickly and simultaneously over the whole length of a train because of the mechanism 200 for additional discharge of the pressure in the main line. The mechanism 150 permits individual adjustment of application of the brake mechanisms 6 depending upon the load and type of a particular car and the speed of a train. The brakes may be gradually released to any desired degree and will be held in such position for any length of time. Compressed air will be supplied to the supply tank 4 from the main line during the application of the brakes, thus making said tank inexhaustible. My air brake is highly efficient and reliable under any weather and climatic conditions.

Having thus described my invention, I claim:

1. An air brake system including a main line normally carrying air at a certain standard pressure; a brake mechanism; a supply tank; and an actuating mechanism connected with the main line, supply tank and brake mechanism, said actuating mechanism comprising means for allowing the compressed air to pass from the supply tank into said brake mechanism when the air pressure in the main line decreases, and for restricting the passage of compressed air from said tank into said brake mechanism when the pressure of air in the main line raises to said standard pressure; a valve adapted to open and to close at certain air pressures; and means for bringing said valve in communication with said main line when the air pressure in the latter decreases to a certain level, so as to discharge said compressed air from the main line into the atmosphere and thereby reduce the pressure thereof to a certain level.

2. In an air brake system a combination of a main line normally carrying compressed air at a certain standard pressure, a brake mechanism, and an actuating mechanism operable by the air pressure changes in the main line and adapted to actuate said brake mechanism when the pressure in the main line drops to a certain operating pressure which is lower than said standard pressure; with a device for additional discharge of compressed air adapted to be put by said actuating mechanism in communication with the main line when the air pressure therein begins to drop, said device being adapted to reduce the pressure in said main line to said operating level by discharging the compressed air directly into the atmosphere.

3. In an air brake system a combination of a main line normally carrying compressed air at a certain standard pressure, a brake mechanism, and an actuating mechanism operable by the air pressure changes in the main line and adapted to actuate said brake mechanism when the pressure in the main line drops to a certain operating pressure which is lower than said standard pressure; with a device for additional discharge of compressed air adapted to be put by said actuating mechanism in communication with the main line when the air pressure therein begins to drop; said device comprising a spring pressed valve adapted to reduce the air pressure in said main line to said operating level.

4. In an air brake system including a main line carrying compressed air at a standard pressure and a brake mechanism operable by compressed air; means for graduated intermittent release of the brakes comprising a first, spring pressed, piston adapted to be actuated by the compressed air in the main line, a second piston adapted to be actuated by the compressed air in the brake mechanism; means for yieldingly holding said pistons apart, and means carried by the second piston for releasing the compressed air from the brake mechanism depending upon the air pressure in the main line.

5. In an air brake system including a main line carrying compressed air at a standard pressure and a brake mechanism operable by compressed air; means for graduated intermittent release of the brakes comprising a first, spring pressed, piston adapted to be actuated by the compressed air in the main line, a second piston adapted to be actuated by the compressed air in the brake mechanism; means for yieldingly holding said pistons apart, and a valve arranged in the second piston adapted to release the compressed air from the brake mechanism depending upon the air pressure in the main line.

6. In an air brake system including a main line carrying compressed air at a standard pressure and a brake mechanism operable by compressed air; means for graduated intermittent release of the brakes comprising a chamber adapted to communicate with the main line; a spring pressed piston in said chamber adapted to be actuated by the compressed air in the main line; a second chamber formed adjacent the first mentioned chamber adapted to be placed in communication with the brake mechanism; a second piston in said second chamber adapted to be actuated by the compressed air in the brake mechanism; means for yieldingly holding the first mentioned piston and the second piston apart; and a valve arranged in the second piston for releasing the compressed air from the second chamber depending upon the pressure of the compressed air in the first mentioned chamber.

7. In an air brake system including a main line carrying compressed air at a standard pressure and a brake mechanism operable by compressed air; means for graduated intermittent release of the brakes comprising two pistons one of which is adapted to be subjected to air pressure of the main line and the other to the air pressure of the brake mechanism; yieldable means for holding the pistons apart; means carried by the second mentioned piston and operable by the first mentioned piston for release of the air pressure in the brake mechanism.

8. In an air brake system a combination of a main line normally carrying compressed air at a certain standard pressure, a brake mechanism, and an actuating mechanism operable by the air pressure changes in the main line and adapted to actuate said brake mechanism when the pressure in the main line drops to a certain operating pressure which is lower than said standard pressure; with a device for additional discharge of compressed air comprising a housing having a passage therein adapted to be put by the actuating mechanism in communication with the main line whenever the air pressure in the latter begins to drop; a spring pressed valve having a frustro-conical portion and a flat shoulder therearound, said passage having formed therein a corresponding conical seat and a flat ring-shaped shoulder therearound upon which said valve normally rests.

9. A device for release of compressed air to a certain pressure, comprising a housing having a passage therein a valve arranged in said passage, said valve having a central frustro-conical portion and a flat shoulder therearound, said passage having a valve seat arranged therein, a spring pressing said valve upon said seat, and means adapted to admit compressed air into said passage.

10. In an air brake system having a braking mechanism, a supply tank normally charged with compressed air, and an actuating mechanism adapted to put said braking mechanism and supply tank in communication; means for selecting the speed of application of the brakes by said braking mechanism comprising a stop-cock having various passages therein, a valve communicating with said stop-cock, a piston adapted to actuate said valve so as to pass a greater amount of air in the beginning of a braking operation and a smaller amount of air when pressure in braking mechanism reaches certain level, a second valve connected with the stop-cock, a second piston, the latter having different areas exposed to the pressure of air passing through said stop-cock and arranged to control the second valve so as to pass air therethrough at the pressure equal to a fraction of that in the supply tank.

11. In an air brake system having a braking mechanism, a supply tank normally charged with compressed air, and an actuating mechanism adapted to put said braking mechanism and supply tank in communication; means for selecting the speed of application of the brakes by said braking mechanism comprising a stop-cock having various passages therein, a valve communicating with said stop-cock, a piston adapted to actuate said valve so as to pass a greater amount of air in the beginning of a braking operation and a smaller amount of air when pressure in braking mechanism reaches certain level, a second valve connected with said stop-cock, a second piston having two different areas so arranged as to be exposed to the pressure of air from the supply tank, said second piston being adapted to control said second valve as to pass the air therethrough at a pressure equal to one-half of that in the supply tank.

DMITRI ANDREIEVICH KALOSHIN.